July 15, 1941.  C. HOLLERITH  2,249,139
BRAKE CONSTRUCTION
Filed May 24, 1939  2 Sheets-Sheet 1
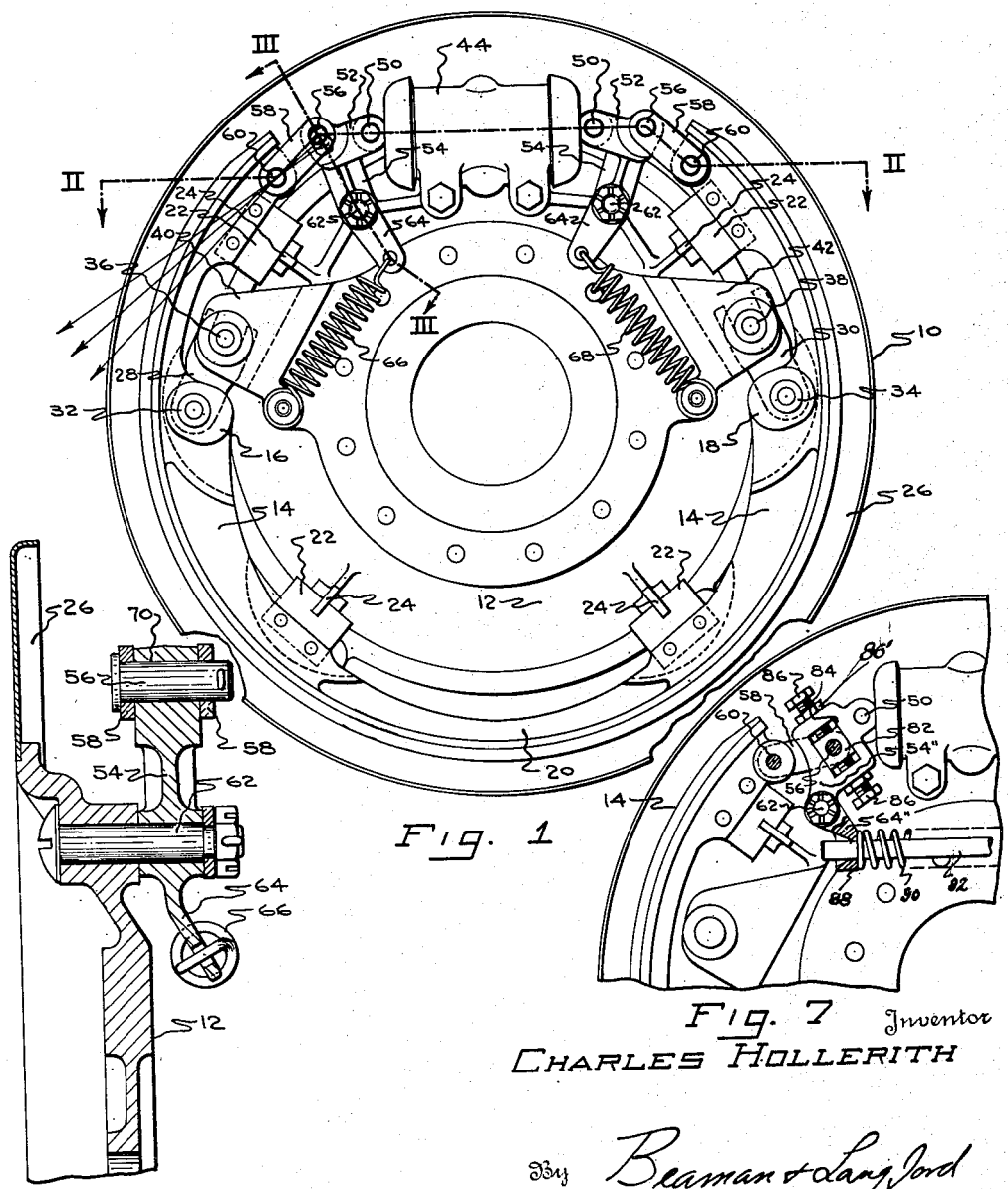
Inventor
CHARLES HOLLERITH
By Beaman & Langford
Attorneys Inventor
CHARLES HOLLERITH
By Beaman & Langford
Attorneys Patented July 15, 1941

2,249,139

UNITED STATES PATENT OFFICE 2,249,139

BRAKE CONSTRUCTION

Charles Hollerith, Jackson, Mich., assignor to Hayes Industries, Inc., Jackson, Mich., a corporation of Michigan Application May 24, 1939, Serial No. 275,354

3 Claims. (Cl. 188—78)

The present invention relates to improvements in brake mechanism having general application and particularly adaptable to brakes upon aircraft.

Because of the relatively small quantities in which brakes for aircraft are manufactured, as compared with vehicle brakes, they are expensive in construction. Moreover, all differences in weight and streamlining between aircraft affect brake performance and capacity. Thus the field of application of a specific aircraft brake has heretofore been extremely limited and the manufacture of brakes of different capacity and performance has been relatively inflexible.

Thus it becomes the object of the present invention to improve the design of brake mechanism so as to facilitate the manufacture of brakes of desired performance and capacity for satisfying different braking problems. The invention is deemed to reside in the arrangement, combination and construction of parts disclosed and their mechanical equivalents for carrying out the aforesaid object.

Figure 6:
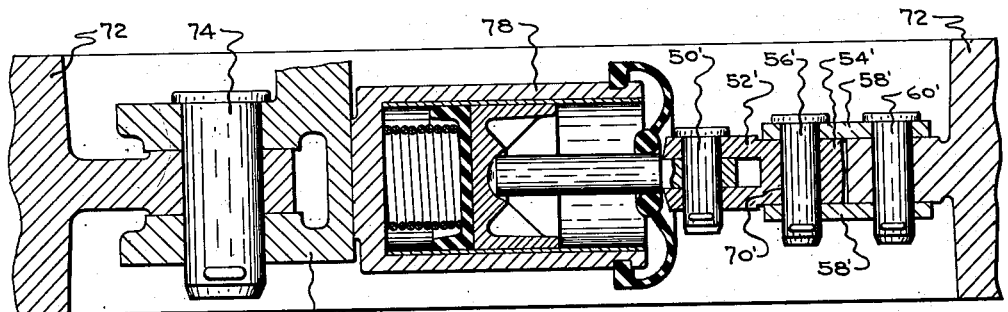
Figure 5:
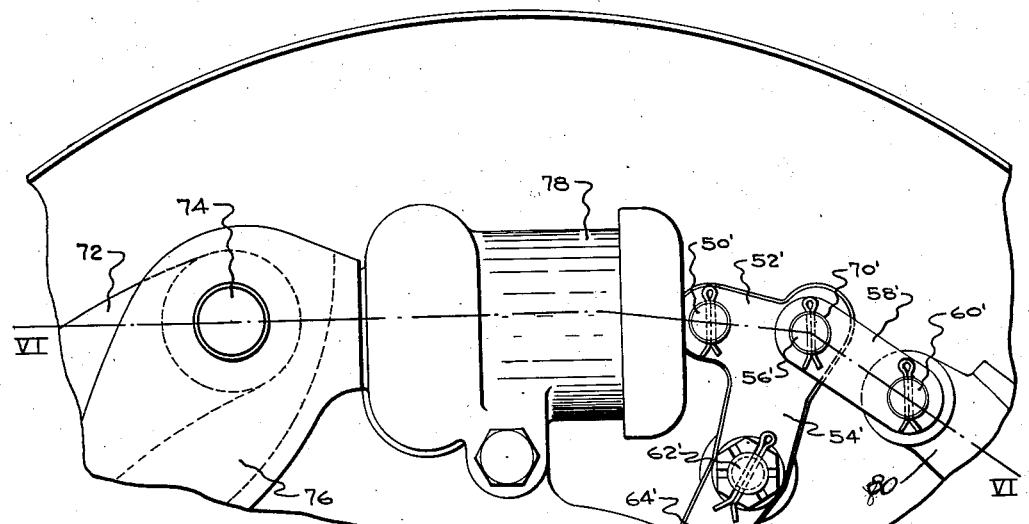
Figure 4:
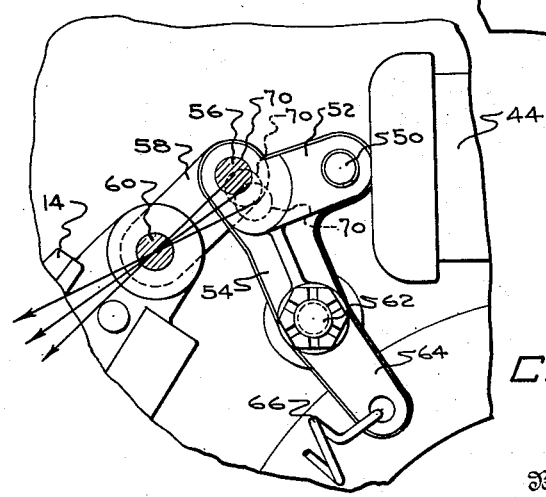

In the drawings, wherein two different types of brakes are shown embodying the invention, Fig. 1 is a side elevational view of a reversible servo brake constructed in accordance with the present invention, Fig. 2 is a cross-sectional view taken on line II—II of Fig. 1, Fig. 3 is a sectional view taken on line III—III of the control lever, Fig. 4 is an enlarged fragmentary elevational view of a detail of the construction shown in Fig. 1, Fig. 5 is a broken view similar to Fig. 1 of a unidirectional servo brake embodying the present invention, Fig. 6 is a cross-sectional view taken on line VI—VI of Fig. 5, and Fig. 7 is a fragmentary elevational view of an adjustable connection between the servo control lever and the brake shoe.

In Fig. 1 is shown a brake assembly 10 particularly designed for aircraft use, being of a reversible servo type. The torque plate is indicated at 12 and supports the brake shoe 14 which is diminishing T-section from points 16 and 18, at which the torque is transferred to the plate 12, to the central point 20. Plates 22 attached to the web of the brake shoe 14 coact with adjustable guiding stops 24 which may be of the same general construction as shown in my U. S. Patent No. 2,124,949. As more clearly shown in Fig. 3, a fairing 26 is shown supported from the torque plate 12. The structure for transferring the torque from the brake shoe 14 to the torque plate 12 comprises links 28 and 30 pivotally supported at one end upon pins 32 and 34 mounted in the heavy sections of the brake shoe 14 and forked at their opposite ends to have both abutting and lost motion connections with pins 36 and 38 supported in the forked sections 40 and 42 of the torque plate 12 depending upon the direction of servo action.

Supported from the torque plate 12 in a well known manner is the operating cylinder 44 of equally known construction. Pistons 46 carry piston rods 48 which are pinned at 50 to the forked ends 52 of the generally L-shaped servo control levers 54. As more clearly shown in Figs. 3 and 4, the levers 54 at their outer ends are pinned at 56 to the pivotal connector links 58 pinned at 60 to opposite ends of the brake shoe 14. The control levers 54 are pivotally connected to the torque plate 12 at 62 and have inner ends 64 to which the retractor springs 66 and 68 connect. As between right and left hand brake assemblies the only difference in construction resides in the fact that the springs 66 and 68 are of different tension with the heavier spring holding the anchored end of the brake shoe for braking forward movement of the aircraft or vehicle upon which the brake is installed. Thus if the spring 68 is the heavier with the brake released, the forked end of the link 30 would be held solidly against the pin 38. Where the springs 66 and 68 are of equal tension or a single compression spring is used between the tail portions 64 of the lever 54, a separate spring will be used to hold one of the anchor ends of the brake shoe 14 against one of the pins 36 and 38.

One of the features of the above described construction resides in the fact that by the simple operation of changing the location at which the holes 70 are machined in the control levers 54, the character of performance and capacity of the brake may be materially changed to meet the particular need. As shown in Fig. 4, change in location of the hole 70 receiving the pin 56 will alter the line of applied force as indicated by the arrow. As the location of the hole 70 is moved toward the pivot 62, the applied force will be more radial and less tangential with the result that the servo action will be increased. In practice it has been found that where similar brakes give satisfactory performance upon an aircraft of one weight and unsatisfactory performance upon an aircraft of slightly greater weight, a slight change in location of the holes 70 adapts the brake to the heavier aircraft.

In Figs. 5 and 6 the control lever construction of Fig. 1 is shown adapted to a brake having servo action in only one direction of wheel rotation. One end of the brake shoe 72 is shown pivoted at 74 to the torque plate 76 carrying the single acting cylinder 78. The opposite end 80 of the brake shoe 72 is projected and retracted by the control lever 54' the primed reference character of which indicates similar unprimed parts of Fig. 1. The operation in the single acting servo brake is the same as in the double acting brake of Fig. 1.

In Fig. 7 is shown a modified form of servo control lever in which provisions are made for adjusting the pivotal axis of the linkage between the control lever and the brake shoe. As illustrated the pin 56 connecting the links 58 to the control levers 54'' is carried in a block 82 guided in a slot 84. Adjustment screw 86 locates the block 82 in the slot 84 in conjunction with the lock nuts 86'. This arrangement for regulating the line of action of the applied braking force through the links 58 enables individual brake adjustment in the field to the particular installation. Numerous other forms of adjustment structure will readily suggest themselves to those skilled in the art all within the scope of the present invention. The tail 64'' is shown formed into a spring seat at 88 to take the thrust of the compression spring 90 guided by a rod 92 and extending between the tails of the control levers.

Having described my invention, what I desire to protect by Letters Patent and claim is:

1. A servo type brake comprising a torque plate, a curvilinear brake shoe having an anchorage at one end with said plate, a brake actuator supported from said plate adjacent the other end of said shoe, servo control means supported from said plate and connected to said actuator, a push bar located between said means and said other end of said shoe and having an adjustable connection with said means, the servo action of said shoe through movement of said actuator being controlled by the location of the connection between said bar and means.

2. A servo type brake comprising a torque plate, a curvilinear brake shoe having an anchorage at one end with said plate, a brake actuator supported from said plate adjacent the other end of said shoe, a servo control lever pivotally supported upon said plate and connected to said actuator, and a push bar connected to said other end of said shoe and adjustably connected to said lever with the point of connection of said bar with said lever characterizing the servo action.

3. A servo type brake comprising a torque plate, a curvilinear brake shoe having an anchorage at one end with said plate, a brake actuator supported from said plate adjacent the other end of said shoe, a servo control lever pivotally supported upon said plate and connected to said actuator, and a push bar connected to said other end of said shoe and selectively connectable to said lever at radially spaced points with the points of connection of said bar with said lever characterizing the servo action.

CHARLES HOLLERITH.